(12) United States Patent
Amelio (10) Patent No.: US 12,504,464 B2
(45) Date of Patent: Dec. 23, 2025

(54) BURN-IN STATION FOR PERFORMING BURN-IN TESTING OF ELECTRONIC DEVICES

(71) Applicant: Microtest S.p.A., Vicopisano (IT)

(72) Inventor: Giuseppe Amelio, San Pietro (IT)

(73) Assignee: Microtest S.p.A., Vicopisano (IT)

( * ) Notice: Subject to any disclaimer, the term of this patent is extended or adjusted under 35 U.S.C. 154(b) by 185 days.

(21) Appl. No.: 18/384,555

(22) Filed: Oct. 27, 2023

(65) Prior Publication Data
US 2025/0138083 A1    May 1, 2025

(51) Int. Cl.
*G01R 31/28*    (2006.01)

(52) U.S. Cl.
CPC ................ *G01R 31/2849* (2013.01)

(58) Field of Classification Search
CPC .......... G01R 31/2874; G01R 31/2863; G01R 31/2875; G01R 31/2879; G01R 31/2862; G01R 31/2868; G01R 31/2877; G01R 31/2806; G01R 31/2896; G01R 1/0433; G01R 1/0458; G01R 31/2865; G01R 31/00; G01R 31/2817; G01R 31/2849; G01R 31/2855; G01R 1/04; G01R 31/286; G01R 31/287
See application file for complete search history.

(56) References Cited

U.S. PATENT DOCUMENTS

| | | | | |
|---|---|---|---|---|
| 5,431,491 A | * | 7/1995 | Melgaard | G01R 31/2868 312/293.1 |
| 7,292,023 B2 | * | 11/2007 | Dangelo | G01R 31/2863 324/750.05 |
| 7,339,387 B2 | * | 3/2008 | Dangelo | G01R 31/2863 324/750.05 |
| 8,008,934 B2 | * | 8/2011 | Wong | G01R 31/2849 324/750.08 |
| 11,255,904 B2 | * | 2/2022 | Kim | G01R 31/2891 |
| 12,174,248 B2 | * | 12/2024 | Ranganathan | G01R 31/2868 |
| 2021/0255237 A1 | * | 8/2021 | Rascon | H01R 12/88 |

* cited by examiner

*Primary Examiner* — Vinh P Nguyen
(74) *Attorney, Agent, or Firm* — Potomac Law Group, PLLC; John J. Penny (57) ABSTRACT

A burn-in station (BIS) for performing burn-in testing of electronic devices, comprising: a main frame; a plurality of burn-in drivers (BIDs) embedded in the main frame and each including a plurality of slots; wherein each of the slots receives a burn-in board (BIB) meant to accommodate a plurality of devices to be tested; wherein each of the slots comprises a slot cover which, in an operative condition, tops the BIB to define a slot chamber enclosing the devices to be tested; wherein the slot cover comprises heating means meant to heat the underlying slot chamber.

13 Claims, 11 Drawing Sheets

BURN-IN STATION FOR PERFORMING BURN-IN TESTING OF ELECTRONIC DEVICES

TECHNICAL FIELD

The present invention is generally directed to the field of burn-in, and more particularly to a burn-in station (BIS) for performing burn-in testing of electronic devices.

PRIOR ART

Burn-in testing comprises testing an electronic device or a semiconductor device, such as, but not limited to, an integrated circuit, a computer chip, a memory chip or a system on a chip, for example, for an extended period of time under various conditions to determine if there are any problems with the electronic device before it is used in the field. In other words, the electronic devices can be stress tested to detect early failures thereby increasing the reliability of the electronic devices that are tested. After stress testing the devices are screened to determine if they passed the stress tests.

Generally, burn-in of electronic devices is the acceleration of the life of the electronic devices using various combinations of voltage, temperature, and time. Burn-in predicts different quality levels of the electronic devices associated with time. Electronic device manufacturers typically use burn-in to estimate the lifetime of semiconductor devices. In addition, burn-in is also a quality measure to estimate the number and/or the type of defects in the electronic devices over time. Burn-in is also used to accelerate a device past infant mortality. Infant mortality is an initial phase of device life. A device with a short life usually fails early in its life during the phase of infant mortality. Once a device has passed this initial phase of life, the device is more likely to function for many more years.

To burn-in a device, the device is usually housed into a socket on a burn-in board (BIB). The BIB is the large circuit board used to hold and route signal traces for all of the devices undergoing burn-in. The BIB typically has a number of sockets to accommodate multiple devices. The devices are plugged into the sockets on the BIB, which is transferred into a chamber for burn-in.

A driver card for providing signals in a test mode entry sequence and clock signals to the devices under burn-in is mounted onto the BIB. Further, the BIB may be provided with power tabs coupled to bus-bar power chips when the BIB is loaded into a cart, which is secured to a housing and/or a power supply rack of the docking station. Moreover, the BIB may also include a LED for each socket. A device undergoing burn-in in the socket drives the LED such that the LED flashes if the device is running properly.

However, the integration of the driver and other electronic components with the BIB will degrade the reliability of the burn-in system as the driver and the electronic components can be affected by the high temperature during the temperature stress test. As a consequence, it can in turn reduce the accuracy of the burn-in testing of the electronic devices.

On the other hand, in general, a hot chamber, which is a test chamber, is used to test BIBs in a high temperature operating range that can range from the environment temperature (i.e., the ambient or room temperature) up to about +150 degrees Celsius for example. In this case, heating is provided by heating elements and forced air fans that circulate the heated air throughout the hot chamber. As all of the BIBs are arranged in a single hot chamber, it is not easy to guarantee an even temperature distribution throughout the chamber, and thus different BIBs at different positions can undergo different heating temperatures, resulting in a poor test result.

In addition, when the BIBs are tested in a low temperature operating range, a separated cold chamber will be provided to perform the test under a low temperature ranging from the environment temperature down to about −40 degrees Celsius for example. There is also the defect of uneven temperature distribution. Moreover, the testing process is complicated, as different chambers should be provided for the high and low temperature testing.

Therefore, it is desired to provide an improved BIS for performing burn-in testing of electronic devices in order to overcome the drawbacks present in the prior art.

SUMMARY OF THE INVENTION

The technical problem outlined above is solved by a burn-in station (BIS) for performing burn-in testing of electronic devices, comprising:
a main frame;
at least one burn-in driver (BID) embedded in the main frame and including a plurality of slots;
wherein each of the slots receives a burn-in board (BIB) meant to accommodate a plurality of devices to be tested;
wherein each of the slots comprises a slot cover which, in an operative condition, tops the BIB to define a slot chamber enclosing the devices to be tested;
wherein the slot cover comprises heating means meant to heat the underlying slot chamber.

Preferably, said heating means comprise a heater plate embedded in the slot cover.

Preferably, the slot cover further comprises a heat insulating portion above the heater plate.

In an embodiment of the invention, the heater plate features different heating zones the heating of which can be independently controlled. The zones can be two or more. The independent control of the heating zones serves the purpose of ensuring a uniform distribution of the temperature within the slot chamber.

The slot cover may further comprise cooling means meant to cool down the underlying slot chamber.

Preferably, the cooling means are configured to be activated alternatively with respect to the heating means, so that the chamber can be either in a heated condition or in a cooled condition.

Preferably, said cooling means comprise a network of airflow passages meant to channel cold air within the slot chamber.

The airflow passages may comprise a plurality of air outlets which, in a preferred embodiment, are arranged in correspondence with a plurality of sockets of the BIB, each socket being arranged to accommodate a single device to be tested.

The airflow passages may comprise a plurality of air inlets from which cold air enters, said air inlets being provided on the two opposite sides of the slot cover to ensure better uniformity of the air distribution during the cooling phase.

Preferably, said airflow passages are arranged to be connected with a source of cold air, for instance a compressed air network. A heat exchanger, for example an external heat exchanger, may be employed in some instances where a substantial cooling rate of the chamber is required.

Preferably, sealing elements are provided at each slot to separately seal each slot chamber from its outside environment.

The sealing elements can be selectively activatable to close and open the slot chamber.

Preferably, the sealing elements are configured to close the slot chamber when the heating means are activated and to open the slot chamber when the cooling means are activated.

In a preferred embodiment, the sealing elements are inflatable sealing elements disposed on a perimeter of the BIB.

The BIS can comprise a controller connected to each of the plurality of slots through dedicated local control electronics and configured to generate command signals and analyze test results, wherein the local control electronics is external to the slot chamber.

Features and advantages of the present invention will be disclosed with reference to the enclosed drawings relating to an indicative and a non-limiting implementation example.

DETAILED DESCRIPTION

In the following detailed description, reference is made to the accompanying drawings that form a part hereof and in which specific embodiments are disclosed by way of example. In the drawings, like numerals describe substantially similar components throughout the several views. Other embodiments may be disclosed, and structural changes may be made without departing from the scope of the present disclosure. The following detailed description is, therefore, not to be taken in a limiting sense.

Figure 1:
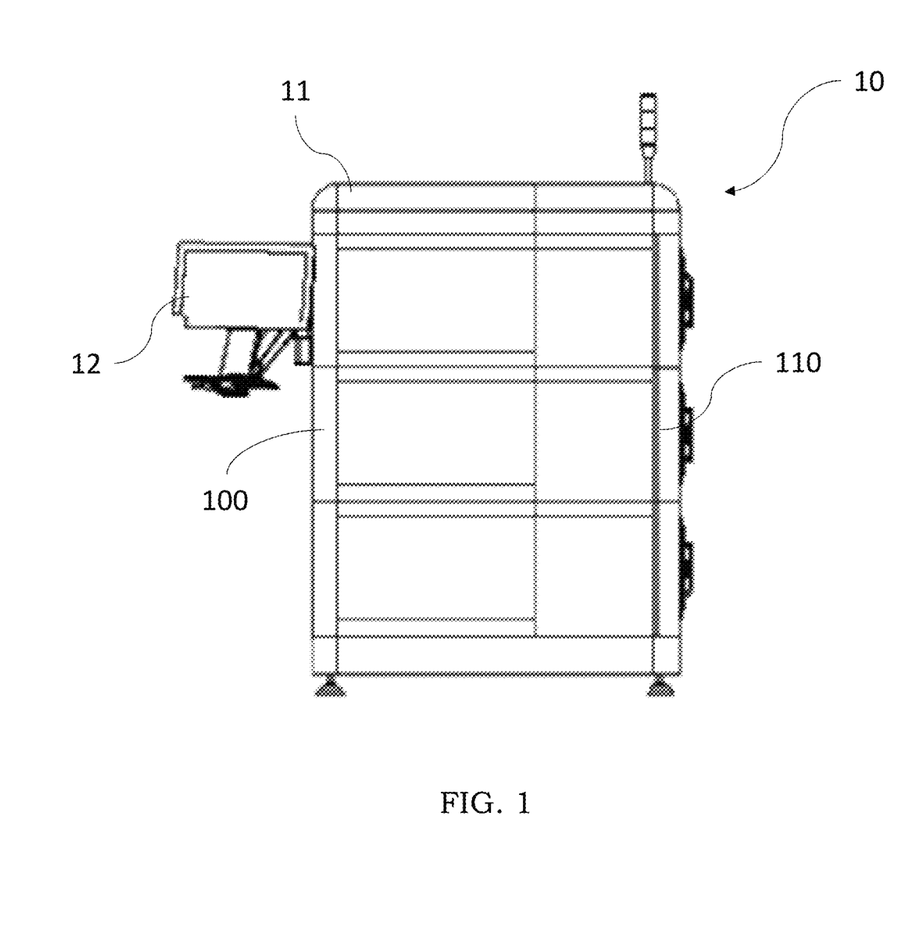
FIG. 1 is a side view of a burn-in station (BIS) for performing burn-in testing of electronic devices according to an embodiment of the present invention.
Figure 2:
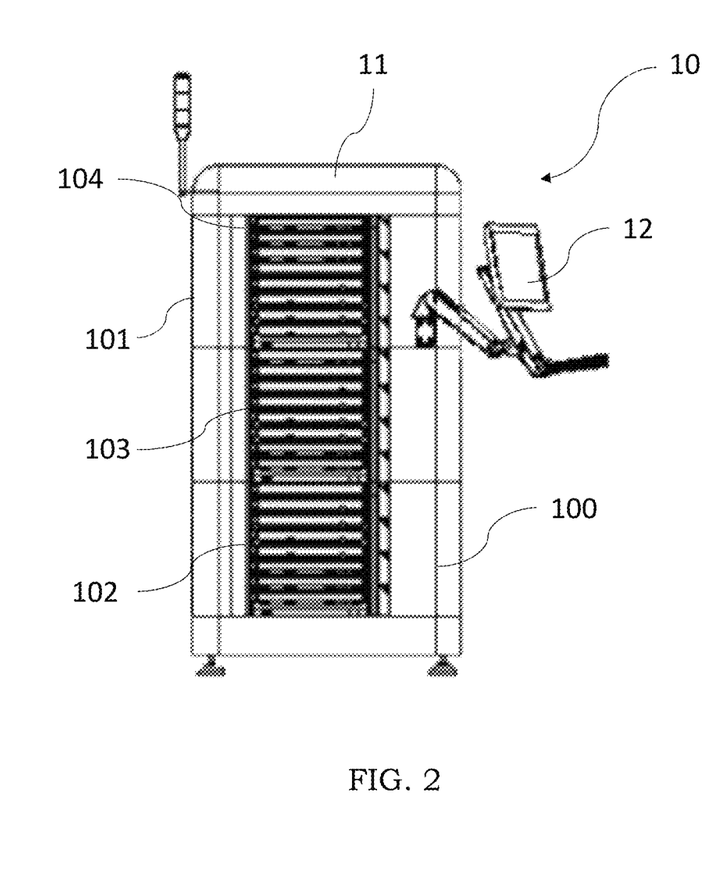
FIG. 2 is a front view of the BIS for performing burn-in testing of electronic devices according to FIG. 1.

As shown in FIG. 1, according to an embodiment of the present invention, a burn-in station (BIS) 10 for performing burn-in testing of electronic devices includes a main frame 11, a plurality of burn-in drivers (BIDs) 100 embedded in the main frame 11 and each including a plurality of slots 103, and a controller 12 connected to each of the plurality of slots 103 through local control electronics 137a, 137b and configured to generate command signals and analyze test results. According to the embodiment of the present invention, each of the plurality of slots 103 is configured to receive a burn-in board (BIB) 135, which is connected to the local control electronics 137a, 137b provided for said slot 103 and configured to receive a device for testing.

According to the embodiment described in the figures, the BIB 135 can be extracted from a frontal opening 104 of the main frame 11. Therefore, each single slot 103 opens on the frontal opening 104.

Figure 3:
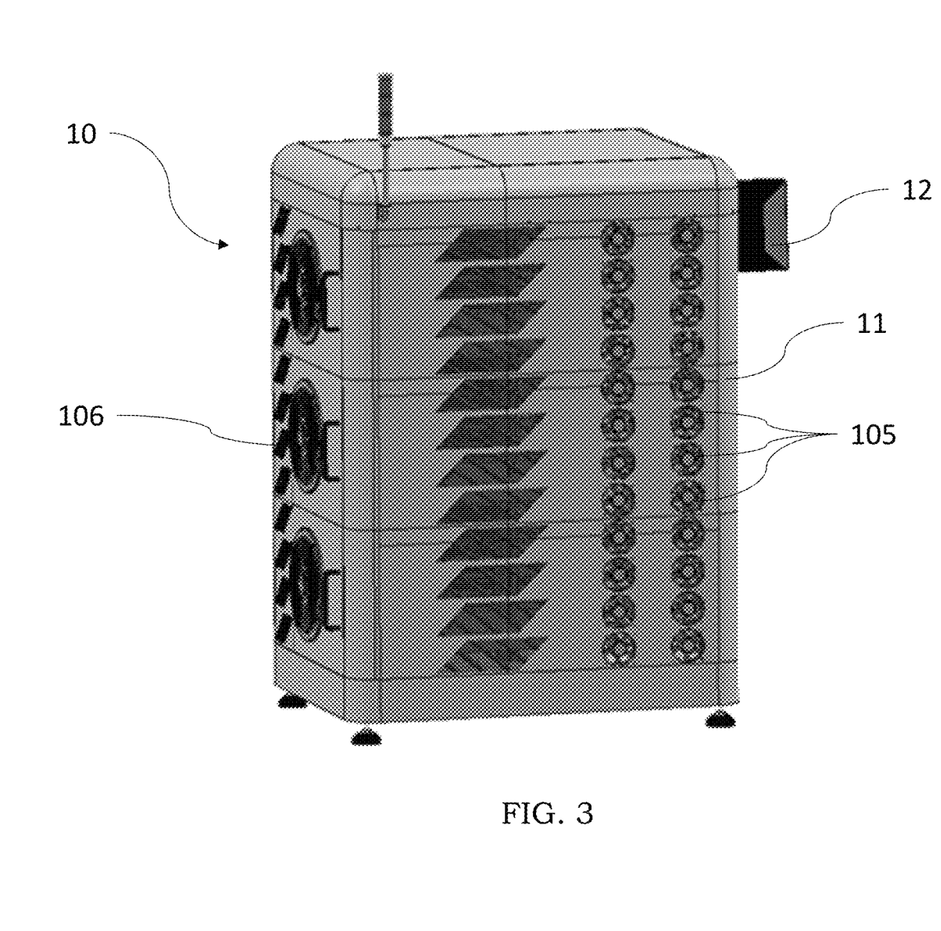
FIG. 3 is a perspective view of the BIS according to FIG. 1.

As best seen in FIG. 3, a plurality of air fans 105, 106 are provided on the main frame 11 through the casing thereof. Lateral air fans 105 are provided on the lateral sides of the main frame 11 in the proximity of the frontal opening 104, while rear air fans are provided in the back panel of the main frame, opposite the frontal opening 104.

Within each slot 10, a driver 131 is provided at the rear, i.e. the portion which is more distant from the frontal opening 104 and which is served by the rear air fans 106, while the slot case BIB 135 is located at the front, next to the frontal opening 104.

The driver 131 comprises a first portion 137a of the control electronics, while a second portion 137b is located at the bottom of the BIB 135 or below it. As previously discussed with regard to the prior art, the local control electronics 137a, 137b can comprise, among others, one or more driver cards and one or more power tabs, which are preferably integrated in the first portion 137a i.e. in the driver 131.

In the embodiment of the present invention, the controller 12 includes a display and an input device for monitoring and/or operating the BIS 10 during the burn-in testing of the electronic devices. Although the controller 12 is shown as a local device, it can be also a remote device wirelessly networked using wireless signals in accordance with a wireless communication network such as a secured Wi-Fi network. The controller 12 controls the operation of the BIS 10. The controller 12 can be any suitable processor, controller or digital signal processor that can provide sufficient processing power depending on the configuration and operation requirements of the controller 12 and also contains sufficient memory for storing data and databases. For example, the controller 12 may be a high-performance general processor. In alternative embodiments, the controller 12 may include more than one processor with each processor being configured to perform different dedicated tasks.

In an embodiment of the present invention, as show in FIG. 1, the BIS 10 may include three different climate zones for performing different burn-in tests. However, the present invention is not limited thereto. The BIS 10 of the present invention may include more or less climate zones or may not have differentiated climate zones at all. According to an embodiment of the present invention, the different climate zones can be controlled separately, which means that the temperature can be independently set for each different climate zone. This way differentiated tests can be carried out simultaneously in the different climate zones.

In each climate zone of the BIS 10, a single BID 100 is embedded in the main frame 103, to which a set of BIBs 135 can be smoothly docked. In an embodiment of the present invention, the BIBs 135 can be horizontally docked to the BID 100. Both the BID 100 and the BIB 135 are provided with sufficient interfaces for the automatic board loading. Thanks to these provisions, the BIS 10 disclosed herein is flexible and configurable.

By way of example, the BIS 10 of the present invention may include 24 slots 103, with 8 slots 103 for each BID 100. However, the present invention is not limited thereto. Obviously, the BIS 10 of the present invention may include more or less than 24 slots 103. The number of the slots can be configured according to specific requirements.

Preferably, the temperature accuracy can be set as about ±2° C. during the burn-in testing of the electronic devices. In a preferred embodiment, during the heating phase, the temperature may be ramped up in 10° C./min, and during the cooling phase, the temperature may be ramped down in 5° C./min. However, the present invention is not limited thereto. In an embodiment of the present invention, up to 120 devices can be tested in parallel in each slot 103.

In one embodiment of the present invention, the operating range of the BIB 135 can be from about −40° C. to about +150° C.

According to the embodiment of the present invention, the BIB 135 has a plurality of sockets 136 (shown in FIG. 10 and discussed below) for housing devices to be tested. The sockets 136 are high-temperature range sockets and may have a locking mechanism to hold the device for testing in place during the testing.

In an embodiment of the present invention, as an example, a pitch between two adjacent BIBs can be about 60 mm, and a max socket height can be about 30 mm. However, the present invention is not limited thereto, and may include any other different pitches and socket heights. Moreover, the dimensions can be also modified according to specific requirements.

According to an embodiment of the present invention, each of the BIDs 100 can be either configured to test chips or diodes; moreover, the configuration of the BIS 10 of the present invention can be modified according to the specific requirements. The number of the standard BIDs and diode BIDs within the BIS is not limited, and it can be combined according to requirements on the client side.

As previously discussed, the driver 131 is arranged inside the BIS 10 but in a rear portion with respect to a heated area of the slots 103 in which the BIBS 135 are housed during operation. Therefore, the first portion 137*a* of the local control electronics is set aside and protected with respect to the BIB where the electronic devices to be tested are contained. In this way, the temperature ranges for the electronic devices for testing have no impact on the electronic components that are provided for handling the whole testing activities. Therefore, the BIS 10 of the present invention can provide more accurate test results of the electronic devices for testing.

Figure 4:
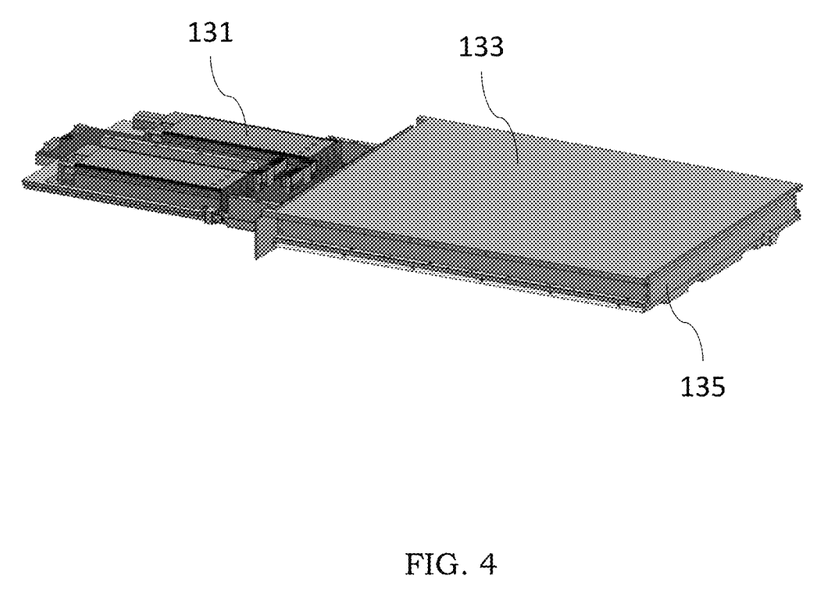
FIG. 4 shows the elements housed within of a slot of the BIS, to which a driver is coupled, according to the embodiment of FIG. 1.
Figure 5:
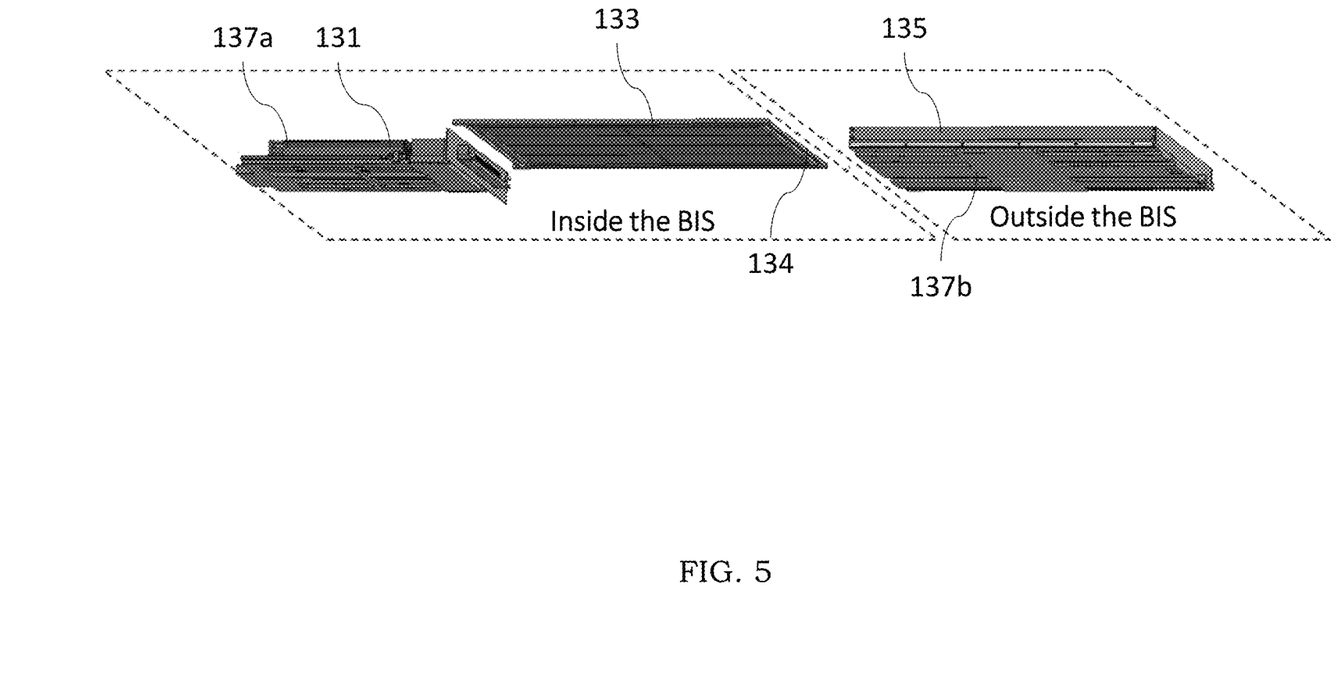
FIG. 5 shows an exploded view of the elements of FIG. 4, indicating which elements are rigidly housed inside the BIS and which elements can be extracted outside the BIS.

As shown in shown in FIGS. 3 and 4, each single slot 103 is provided with a heater plate 134, which is installed and fixed in the slot 103 and faces the top side of the BIB 135 which is inserted therewithin. In particular, the heater plate 134 is comprised in a slot cover 133 which forms the ceiling of the slot 103. More specifically, the heater plate 134 is placed at the bottom of the cover portion 133.

It should be observed that the slot cover 133 also divides the adjacent slots 103. A heat insulating portion 138 is conveniently provided above the heater plate 134, so that the element only conditions the upper part of the BIB 135 underneath, not the lower part of the BIB 135 above. Therefore, the heater plate 134 radiating from above only heats the devices to be tested placed on the BIB 135. The lower portion of the BIB 135, which contains the second portion 137*b* of the control electronics, does not undergo substantial heating since it is isolated from above by the interposed devices to be tested, and from below by the above-mentioned heat insulating portion 138. As a result, even the control electronics 137*b* placed on board of the BIB 135 are spared from the extreme thermal conditions of the tests.

Figure 8:
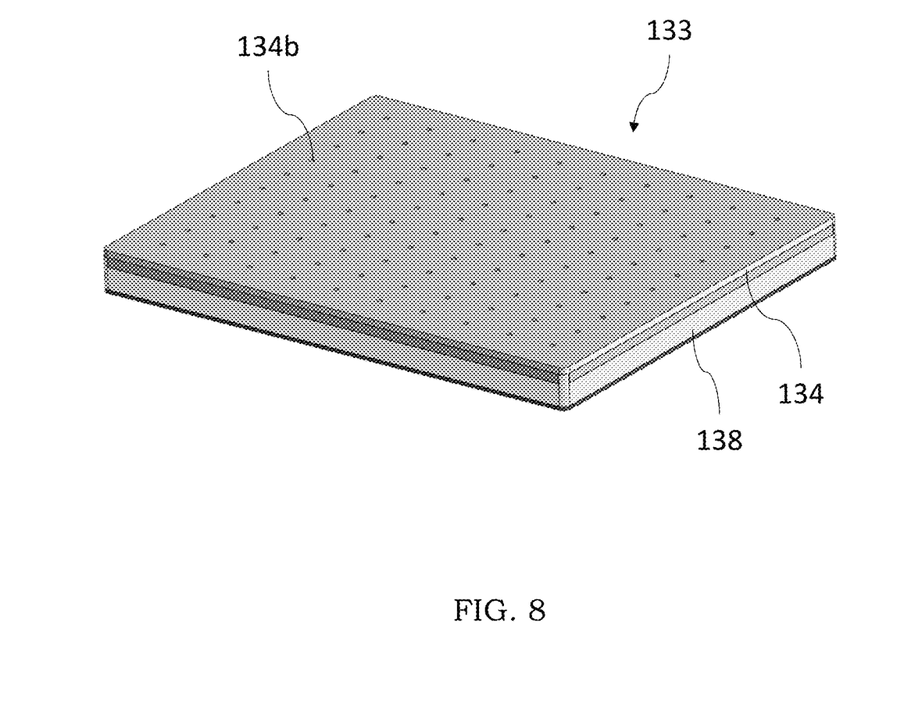
FIG. 8 shows a perspective view of an embodiment of the top cover of the slot of a BIS according to the present invention, flipped upside down.
Figure 9:
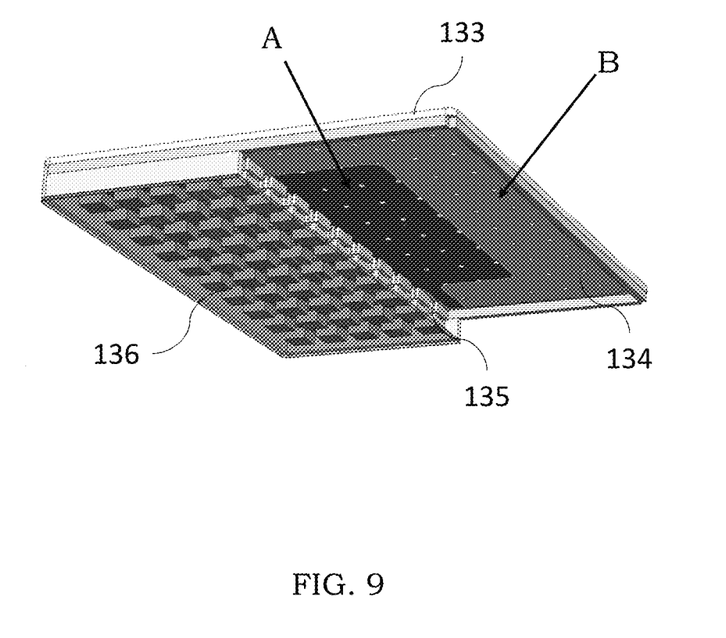
FIG. 9 shows an example of the top cover with the heater plate being coupled to a slot case with the BIB, in which the slot case with BIB is cut to show different heating zones on the heater plate according to an embodiment of the present invention.

A specific embodiment depicted in FIG. 9 has different heating zones A and B on the heater plate 134 for heating the electronic device for testing installed on the sockets 136 (shown in FIG. 10) of the BIB 135 placed in the slot 103. As shown in FIG. 9, only a part of the BIB 135 is shown so that different heating zones A and B can be seen. In FIG. 8, a zone in the center of the heater plate 134 is indicated as heating zone A, while a peripheral zone around the former zone A is indicated as heating zone B.

In an embodiment of the present invention, the heating zone A may be formed by a heating element disposed in the heater plate 134, and the heating zone B may be formed by another heating element disposed in the heater plate 134. In an embodiment of the present invention, the heating elements may be the same. In an embodiment of the present invention, the heating elements may include without being limited to metal resistance heating elements such as Nichrome, Kanthal (FeCrAl) wire, etched foil elements; ceramics and semiconductors such as molybdenum disilicide ($MoSi_2$), silicon nitride, PTC ceramic elements; and/or combined heating elements. The present invention is not limited thereto.

In an embodiment of the present invention, the different heating zones A and B can be separately controlled so that uneven heat distribution at different locations can be avoided, in order to ensure uniform heating of the electronic devices for testing under the heater plate 134. Although there are two heating zones A and B shown in FIG. 9, the present invention is not limited thereto. The shape, size and number of the heating zones on the heater plate 134 can be set according to the specific requirements.

The slot cover 133 further comprises a network of airflow passages 134*c* through which cool air can be forced to regulate a temperature during testing. The airflow passages 134*c* define a cooling system dedicated to each single slot 103. Therefore, during the cooling phase of the burn-in testing of the electronic devices, the cold air is injected from the slot cover 133 through the airflow passages 134*c* to ensure uniform cooling.

In the embodiment of the present invention, the airflow passages 134*c* have a plurality of outlets 134*b* opening above each of the sockets 135 of the underlying BIB 135.

The airflow passages 134*c* form an internal grid within the slot cover 133 and they connect lateral air inlets 134*a* to the air outlets 134*b*. In use, the inlets 134*a* are connected to a source of coolant such as a compressed air network. If required by the system, the air can be further cooled before entry in the airflow passages 134*c* by means of a heat exchanger, which might be external with respect to the BIS 10.

According to a preferred embodiment of the present invention, each of the plurality of slots 103 of the BIS 10 is provided with its own airflow regulator (not shown in the Figures).

Figure 6:
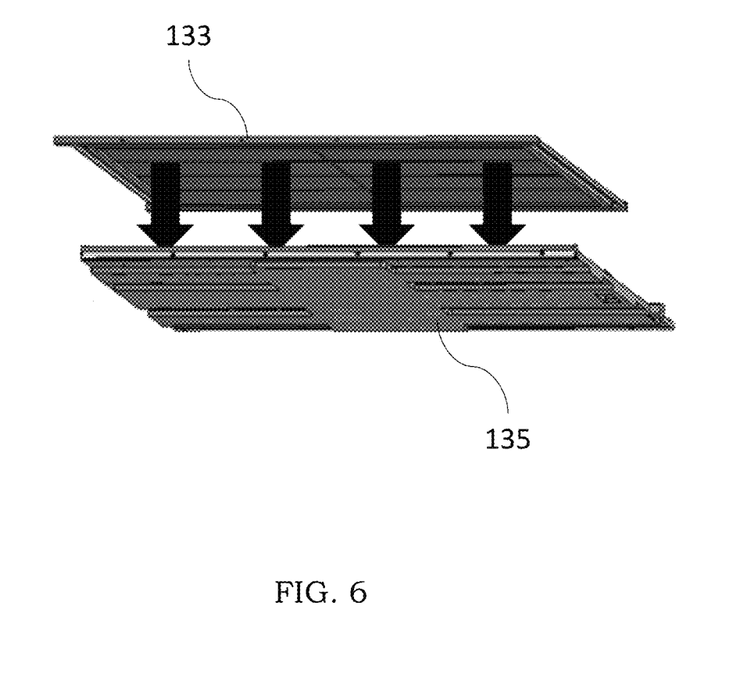
FIG. 6 shows an example of the cold air flow which can be provided within the slot of the BIS according to the embodiment of FIG. 4.
Figure 7:
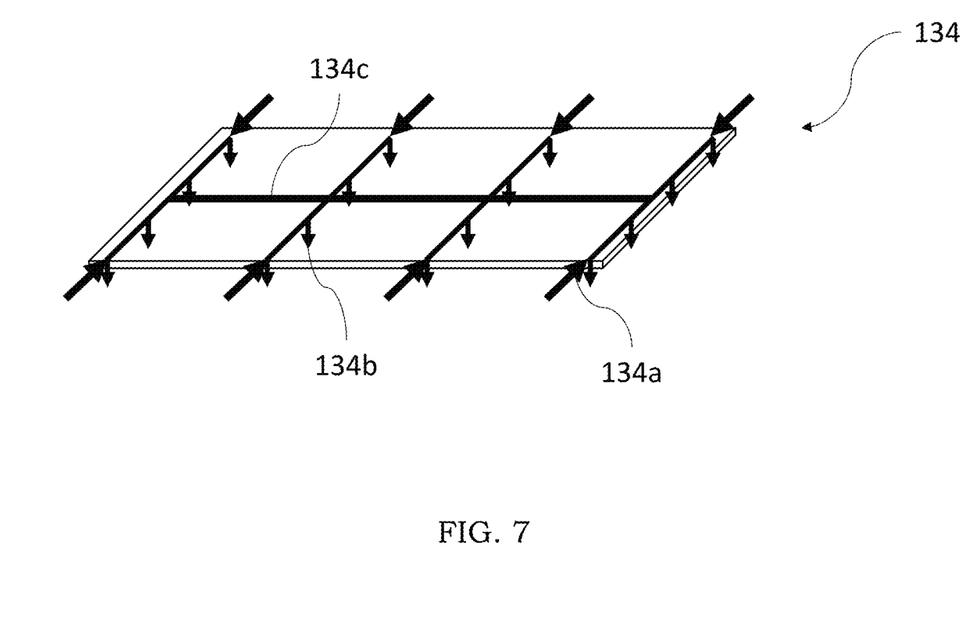
FIG. 7 is a schematic drawing showing the detail of the cold air circulation within a top cover of the slot according to FIG. 4.

As best shown in FIG. 7, air inlets 134a are arranged at both lateral sides of the slot cover 133 to uniform the air flow and air outlets 134b arranged at the bottom side of the slot cover 133 facing the BIB 135 under the heater plate 134. The solid lines shown in FIG. 6 indicate the airflow passages 134c disposed in the slot cover 133 to direct the air flow to be introduced into the underlying slot 103. In an embodiment of the present invention, each of the plurality of slots 103 of the BIS 10 may include its own valve (not shown) for the cold air flow management. According to the embodiment of the present invention, the valve may be configured to regulate the air flow introduced into the slot 103 through the airflow passages 134c. Although a schematic configuration of the airflow passages 134c in the heater plate 134 is shown in FIG. 6, this configuration has only an illustrative scope. The configuration of the airflow passages can be designed according to the specific requirements. In addition, the location and the number of the air inlets and outlets on the heater plate 134 can be also adjusted according to the specific requirements.

Figure 10:
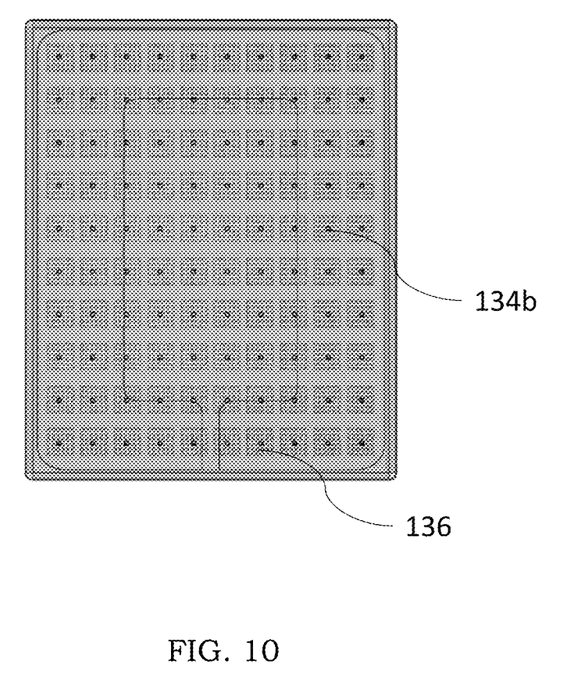
FIG. 10 shows an example of the combination of the top cover with the heater plate and the slot case with the BIB, in which the slot case with BIB is shown in a transparent manner to show the air outlets in the top plate corresponding to the sockets on the BIB according to the embodiment of the present invention.

As best shown in FIG. 10, the air outlets 134b in the heater plate 134 correspond to the sockets 136 on the BIB 135, to which the electronic devices for testing are coupled. With this configuration, refresh air supplied from the heat exchanger can be uniformly forced through the air outlets 134b so as to quickly regulate the temperature of the environment in the BIB 135 where the electronic devices for testing are placed, when a temperature reduction is needed. According to the embodiment of the present invention, one air outlet 134b in the heater plate 134 is arranged directly above one socket 136 on the BIB 135.

Figure 11:
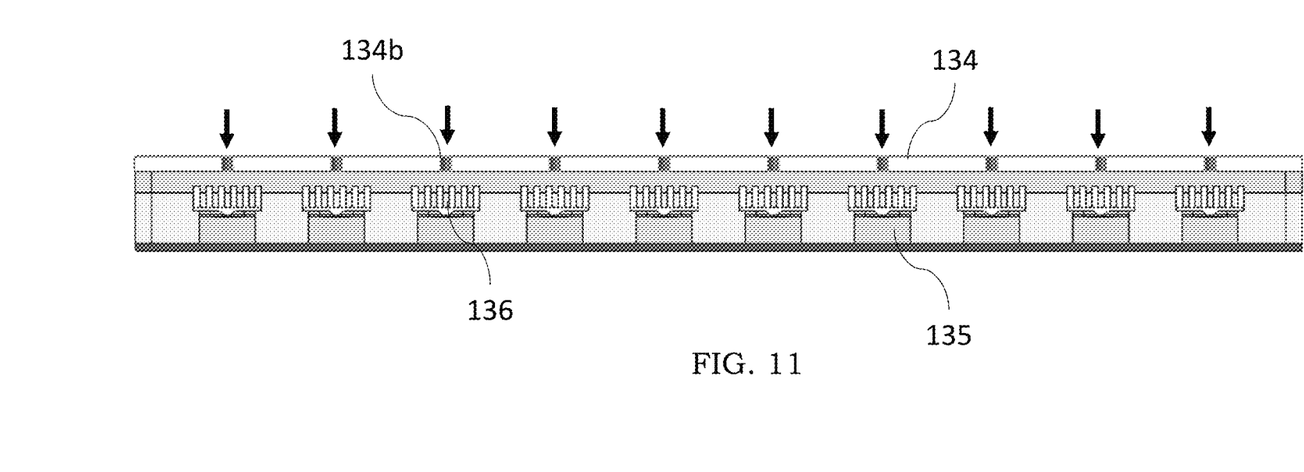
FIG. 11 shows an example of the cold air flow entering from the air outlets in the top and directed to the sockets on the BIB in the slot case according to an embodiment of the present invention.

FIG. 11 shows a cross-section view of the slot chamber into which the cold air flow is introduced through the air flow passages 134c in the heater plate 134. When introducing the cold air into the slot chamber, the air flow passages are filled with the cold air, which is forced into the slot chamber through the air outlets 134b of the heater plate 134 to cool down the electronic devices for testing (not shown) installed on the sockets 136 of the BIB 135.

As best shown in FIG. 4, during use a closed chamber is formed within each slot 103 of the BIS 10. The chamber is defined by the BIB 135 inserted within the slot 103 and topped by the slot cover 133.

In the preferred embodiment of the present invention, the chamber is perimetrically sealed by sealing elements (not shown in the drawings) arranged at the peripheral edge of the BIB 135. Preferably, the sealing elements are inflatable elements which are inflated when activated—thereby effectively closing the gap between the BIB 135 and the slot cover 133—and deflated when deactivated. The slot chamber is therefore closed when the sealing elements are activated and open when the sealing elements are deactivated.

In a heating testing condition, the heater plate 134 is activated and the slot chamber is kept closed to ensure the minimum heat dispersion. In such a heating condition, the lateral and back air fans 105, 106 are activated to circulate air through the main frame 11 and to cool down the control electronics which are on the outside of the slot chamber.

In an alternative cooling condition, the airflow passages 134c draw cool air within the BID to lower the local temperature. In such a cooling condition, the chamber is preferably left open to allow the exhaust air to vent out. The air fans, particularly the lateral air fans 105, are activated to draw the exhaust air out of the main frame 11.

According to the BIS of the present invention, all the electronic components for driving the testing activities of the BIB—i.e. the control electronics 137a, 137b—are placed outside the perimeter of the slot chamber which is heated, and protected with respect to thermal shocks. In this way, the temperature ranges for the electronic devices for testing have a limited impact on the electronic components that are provided for handling the whole testing activities. Therefore, the BIS of the present invention can provide more accurate test results of the electronic devices for testing.

In addition, with the specific configuration of the heater plate 134 in the slot 103, the device for testing in the slot 103 can be heated in a uniform manner during the heating phase, and the cold air can be injected from the top cover to maximize the cooling uniformity.

According to the embodiment of the present invention, the heater plate 134 is driven by the driver 131. In the embodiment of the present invention, the heater plate 134 is coupled with the driver 131 to receive control signals and power supply: this is done by the bias of the second portion 137b of the control electronics which is placed in the bottom portion of the BIB 135.

In an embodiment of the present invention, the controller 12 and/or the dedicated driver 131 perform a proportional-integral-differential (PID) control on the heater plate 134 through a pulse width modulation (PWM) signal. According to the embodiment of the present invention, a temperature sensor (not shown) is provided within the slot chamber so that a close loop control can be performed on the heater plate 134.

Although specific examples have been illustrated and described herein, those of ordinary skill in the art will appreciate that an arrangement to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

The invention claimed is:

1. A burn-in station (BIS) for performing burn-in testing of electronic devices, comprising:
   a main frame;
   at least one burn-in driver (BID) embedded in the main frame and including a plurality of slots;
   wherein each of the slots receives a burn-in board (BIB) meant to accommodate a plurality of devices to be tested;
   wherein each of the slots comprises a slot cover which, in an operative condition, tops the BIB to define a slot chamber enclosing the devices to be tested;
   wherein the slot cover comprises heating means meant to heat the underlying slot chamber;
   wherein said slot cover further comprises cooling means meant to cool down the underlying slot chamber.

2. The BIS according to claim 1, wherein said heating means comprises a heater plate embedded in the slot cover.

3. The BIS according to claim 2, wherein the slot cover further comprises a heat insulating portion above the heater plate.

4. The BIS according to claim 2, wherein the heater plate features different heating zones the heating of which can be independently controlled.

5. The BIS according to claim 1, wherein said cooling means is configured to be activated alternatively with respect to the heating means.

6. The BIS according to claim 1, wherein said cooling means comprises a network of airflow passages meant to channel cold air within the slot chamber.

7. The BIS according to claim 6, wherein the airflow passages comprise a plurality of air outlets arranged in correspondence with a plurality of sockets of the BIB, each socket being arranged to accommodate a single device to be tested.

8. The BIS according to claim 6, wherein the airflow passages comprise a plurality of air inlets from which cold air enters, said air inlets being provided on the two opposite sides of the slot cover.

9. The BIS according to claim 6, wherein said airflow passages are arranged to be connected with a source of cold air, for instance a compressed air network.

10. The BIS according to claim 1, wherein sealing elements are provided at each slot to separately seal each slot chamber from its outside environment.

11. A burn-in station (BIS) for performing burn-in testing of electronic devices, comprising:
    a main frame;
    at least one burn-in driver (BID) embedded in the main frame and including a plurality of slots;
    wherein each of the slots receives a burn-in board (BIB) meant to accommodate a plurality of devices to be tested;
    wherein each of the slots comprises a slot cover which, in an operative condition, tops the BIB to define a slot chamber enclosing the devices to be tested;
    wherein the slot cover comprises heating means meant to heat the underlying slot chamber;
    wherein sealing elements are provided at each slot to separately seal each slot chamber from its outside environment;
    wherein the sealing elements are selectively activatable to close and open the slot chamber.

12. The BIS according to claim 11, wherein said sealing elements are inflatable sealing elements disposed on a perimeter of the BIB.

13. A burn-in station (BIS) for performing burn-in testing of electronic devices, comprising:
    a main frame;
    at least one burn-in driver (BID) embedded in the main frame and including a plurality of slots;
    wherein each of the slots receives a burn-in board (BIB) meant to accommodate a plurality of devices to be tested;
    wherein each of the slots comprises a slot cover which, in an operative condition, tops the BIB to define a slot chamber enclosing the devices to be tested;
    wherein the slot cover comprises heating means meant to heat the underlying slot chamber;
    wherein said slot cover further comprises cooling means meant to cool down the underlying slot chamber;
    wherein said cooling means is configured to be activated alternatively with respect to the heating means;
    wherein sealing elements are provided at each slot to separately seal each slot chamber from its outside environment;
    wherein the sealing elements are selectively activatable to close and open the slot chamber; and
    wherein the sealing elements are configured to close the slot chamber when the heating means is activated and to open the slot chamber when the cooling means is activated.

* * * * *